United States Patent
Hämmerle et al.

(10) Patent No.: US 8,584,882 B2
(45) Date of Patent: Nov. 19, 2013

(54) MULTIPLE-CONTAINER BUNDLE

(75) Inventors: Günter Hämmerle, Lustenau (AT); Hannes Hämmerle, Lustenau (AT)

(73) Assignee: DrinkDirect Handels- und Vertriebs GmbH, Berlin (DE)

( * ) Notice: Subject to any disclaimer, the term of this patent is extended or adjusted under 35 U.S.C. 154(b) by 773 days.

(21) Appl. No.: 12/528,028

(22) PCT Filed: Feb. 21, 2007

(86) PCT No.: PCT/EP2007/001499
§ 371 (c)(1),
(2), (4) Date: Aug. 20, 2009

(87) PCT Pub. No.: WO2007/104409
PCT Pub. Date: Sep. 20, 2007

(65) Prior Publication Data
US 2010/0200582 A1  Aug. 12, 2010

(30) Foreign Application Priority Data
Mar. 13, 2006  (CH) ........................................ 0397/06

(51) Int. Cl.
*B65D 21/032* (2006.01)
(52) U.S. Cl.
USPC ....................................... 220/4.27; 220/23.86
(58) Field of Classification Search
USPC ........... 220/4.27, 23.86, 23.83, 906; 426/115, 426/119, 112, 120
See application file for complete search history.

(56) References Cited

U.S. PATENT DOCUMENTS

| | | | |
|---|---|---|---|
| 2,328,543 A | | 9/1943 | Bauman |
| 2,776,691 A | * | 1/1957 | Tupper ....................... 220/256.1 |
| 3,143,205 A | * | 8/1964 | Ruderian ....................... 206/543 |
| 3,417,895 A | | 12/1968 | Penton |
| 3,885,672 A | | 5/1975 | Westenrieder |
| 4,756,424 A | | 7/1988 | Schwartz |
| 4,883,935 A | * | 11/1989 | Fairchild et al. .............. 219/734 |
| 5,279,841 A | * | 1/1994 | Yu .................................. 426/131 |
| 5,544,770 A | * | 8/1996 | Travisano ....................... 215/230 |
| 5,807,597 A | | 9/1998 | Barnes et al. |
| 7,798,346 B2 | * | 9/2010 | Nelson et al. ...................... 215/6 |
| 2003/0116567 A1 | * | 6/2003 | Jozaki ......................... 220/23.83 |
| 2004/0163986 A1 | | 8/2004 | Pinyot |

FOREIGN PATENT DOCUMENTS

| | | |
|---|---|---|
| DE | 3818684 A1 | 12/1989 |
| NL | 1017886 C1 | 10/2002 |
| WO | 9217376 A1 | 10/1992 |

* cited by examiner

*Primary Examiner* — Stephen Castellano
(74) *Attorney, Agent, or Firm* — Laurence A. Greenberg; Werner H. Stemer; Ralph E. Locher

(57) ABSTRACT

A multi-container bundle has at least two can-type individual containers, which are connected by way of their end-side pouring openings, facing one another. They are releasably connected to one another via a coupling element to form a structural unit. At least one of the can-type individual containers is equipped with a lid that can be ripped open completely. The multi-container bundle already contains all the individual components which are required for a defined mixed beverage and are present in metered form in the individual containers. Here, alcoholic and non-alcoholic components and components which are incompatible with one another are accommodated in separate individual containers.

17 Claims, 2 Drawing Sheets

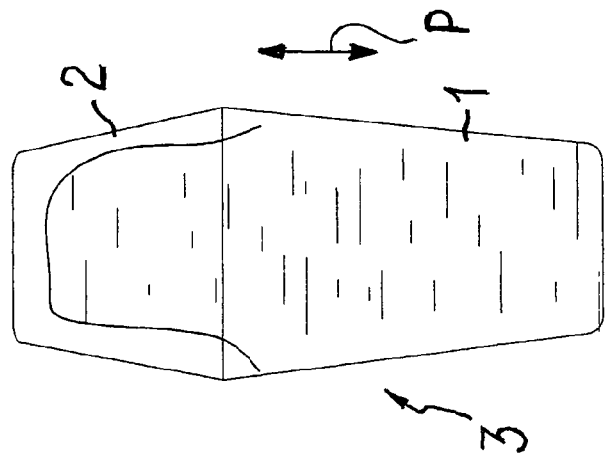
FIG. 4
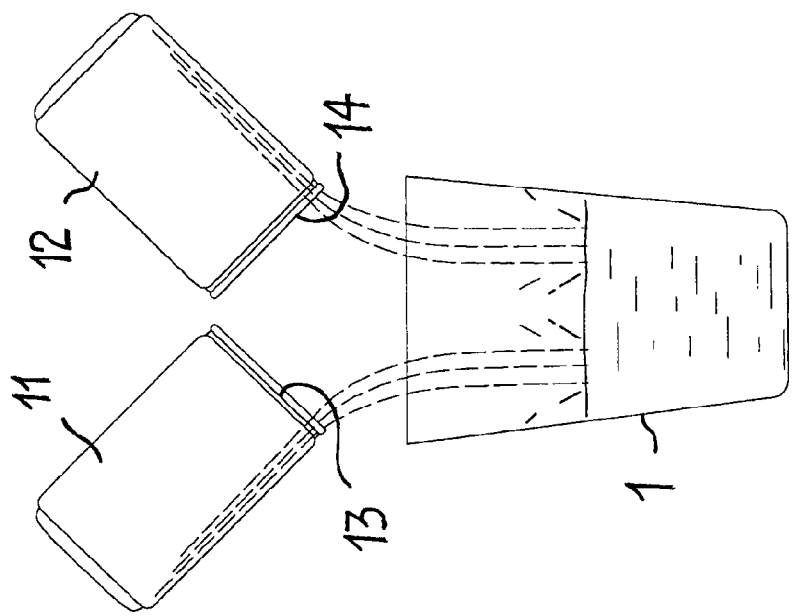
FIG. 3
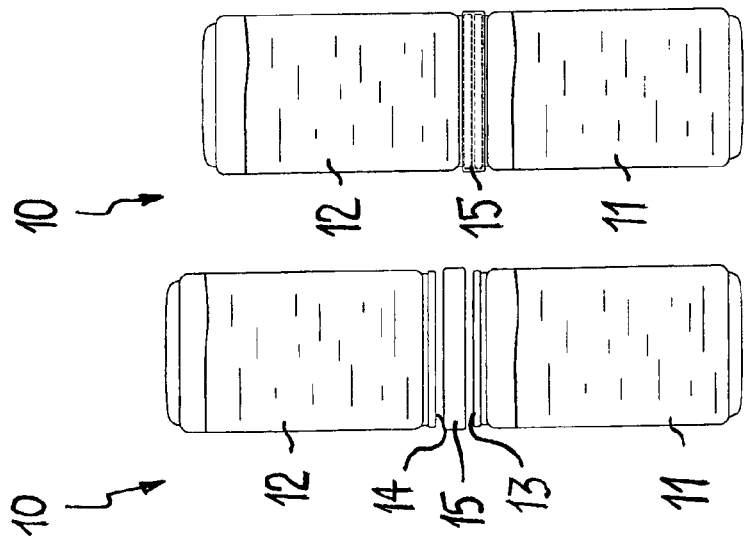
FIG. 1
FIG. 2

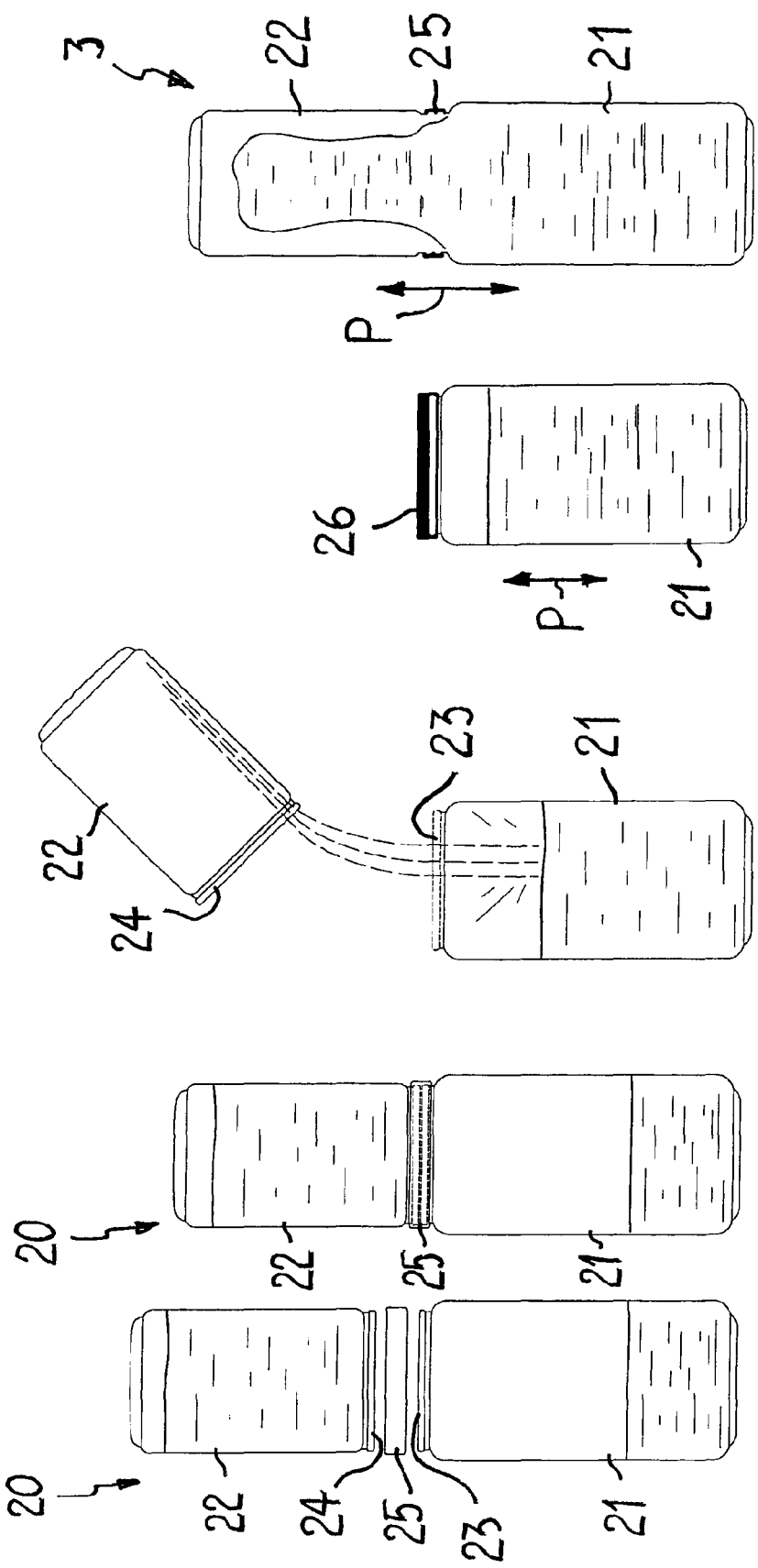

MULTIPLE-CONTAINER BUNDLE

BACKGROUND OF THE INVENTION

Field of the Invention

The invention relates to a multiple-container bundle with two or more individual containers which are connected to one another, facing one another at their end-side pouring-out openings. They are releasably connected via one or more coupling elements and form a structural unit.

It is known in the art to couple a plurality of individual containers to one another for sale. For example, cans or bottles are offered packaged in cartons or cases (crates). The bundle size is often twelve or twenty individual containers having the same content. Smaller bundle sizes, containing for example four or six individual containers, are also known. In what are known as six-packs, six cans or bottles are combined to form a multiple-container bundle. The cans are in this case usually held by a plastics material coupling element which can be provided with a carrying tab or the like. Bottles are conventionally arranged in a cardboard over-pack which is equipped with a carrying handle. DE 10 2004 008 884 A1 discloses, for example, a multiple-container bundle in which two cans are connected to each other so as to be releasable via a coupling element. In this case, the cans are axially oriented and held by their end sides, which are provided with the opening which can be torn open, in the coupling element. Multiple-container bundles have the advantage of allowing the buyer to purchase and transport a larger amount of the desired product single-handedly. For the manufacturer, the larger bundle size or the over-pack offers the advantage of being able to attach more information concerning the product on a larger area, for example an over-pack. The known multiple-container bundles serve to offer larger amounts of the same products which are decanted into identical containers.

Various containers, in particular bottles with closures which allow components of a mixed beverage to be decanted and to be stored separately and, if necessary, to be connected to one another, are also already known in the art.

A bottle for mixing a powdered substance with a liquid is described in U.S. Pat. No. 5,863,126. The bottle has a multipart construction. The liquid accommodated in the bottom bottle part is separated from the powdered substance accommodated in the bottle part arranged thereabove by an axially thrustable plunger with a sealing surface. Once a protective cap has been detached, the plunger is thrust into the low bottle part via elastically deformable covering bellows, so that the powdered substance is poured into the liquid. Once the two components have been mixed, detaching the covering bellows clears a pouring-out opening through which the mixed beverage can be poured out.

U.S. Pat. No. 5,884,759 describes a similar system in which a powdered substance is arranged in a type of lid part above a container partly filled with a liquid. A blocking foil prevents accidental blending of the liquid and solid components. By actuating an extensive push-button provided on the lid, the blocking foil between the two chambers is pierced, so that the two components are blended. Mention is also made of the arrangement in the lid part of a plurality of substances which are each separated from the liquid arranged in the container by severable blocking foils.

JP-A-09 254 990 discloses a container in which two different liquids are accommodated in mutually separated chambers arranged one above another. The two liquids are blended with each other on application of suction by a pumping device.

DE-A-196 21 771 describes a cylindrical cartridge which can be placed onto a container which is partly filled with a solvent. The cartridge has an annular interior which extends concentrically with an axial tube penetrating the cartridge and is filled with an active substance. By pressing the tube down, the bottom of the cartridge is released from the wall of the cartridge, and the active substance can enter the solvent contained in the container. The mix is issued, for example, through the axial tube.

U.S. Pat. No. 6,609,612 B1 discloses a closure part for a bottle that is provided with a number of individually actuatable plungers. The plungers are embodied in a hollow manner and serve to receive various flavoring agents or dyes. Each plunger is closed by a foil to prevent the content of the plunger from flowing out accidentally. When a plunger is pressed down, the closure foil thereof is pierced and the content of the hollow plunger falls into the liquid, for example water, contained within the bottle and can be mixed therewith. A central drinking opening in the closure part allows the prepared milk beverage to be drunk. Once fresh water has been poured into the bottle, a different plunger can be emptied, for example in order to attain a different flavor note. Mention is also made of the fact that the plungers can contain substances which can react with one another after the addition within the liquid arranged in the bottle.

The containers known in the art for producing mixed beverages from different components have in common the fact that in all cases one or more liquid or powdered components are added to form a main component, an excess of which is present in a bottle or a similar container. Usually, this main component, for example water, must first be poured into the bottle before the lid part or a further bottle part or a different type of attachment is placed on or screwed on. Afterwards, the components accommodated in the attachment can be selectively added. The components located in the attachment are each designed for relatively large volumes. Conventionally, the containers are one-liter bottles filled with mineral water or the like. Adding a flavor component, which is often in powdered form, allows the consumer to prepare therefrom a fresh lemonade which is intended for prompt consumption. However, in many cases, the milk beverage contained in the bottle is not consumed in its entirety. Storage of the remainder of the milk beverage can lead to segregations. Therefore, the remainder is usually poured away.

It is in many cases desirable to enjoy a specific alcoholic or non-alcoholic mix beverage. However, the preparation usually lacks the ingredients required therefor or the necessary skill and the patience to prepare the mix beverage. In catering and in hotel bars too, the range of mix beverages on offer is often relatively limited and there is usually also a shortage of staff trained in the preparation of mix beverages. The known containers described hereinbefore are embodied for the bottled production of lemonades or the like. However, these containers are not suitable for the production of relatively small amounts of alcoholic mix beverages or cocktails or alcohol-free, cocktail-like mix beverages. Nor does the remaining relevant prior art disclose any containers which would facilitate simple, portion-by-portion production of alcohol-containing or alcohol-free mixed beverages.

The problem of the present invention is therefore to meet the requirements for the preparation of small amounts of an alcoholic or alcohol-free mixed beverage. The consumer or the user in the hotel industry and catering should be allowed to obtain as a unit the required metered amount of all of the individual components required for a specific mixed beverage and to process them to form the desired mixed beverage. The solution should be economical, simple and self-explanatory in its application.

BRIEF SUMMARY OF THE INVENTION

The solution to these problems consists in a multiple-container bundle with two or more individual containers which are connected to one another so as to be releasable via one or more coupling element(s) and form a unit, which bundle displays the features of the independent claim(s). Developments and/or advantageous variant embodiments of the invention form the subject-matter of the dependent patent claims.

The multiple-container bundle has at least two can-like individual containers which, facing one another at their end-side pouring-out openings, are connected to one another so as to be releasable via a coupling element and form a structural unit. At least one of the can-like individual containers is equipped with a lid which can be torn open completely. The multiple-container bundle already contains all of the individual components which are required for a specific mixed beverage and are present in metered form in the individual containers. In this case, mutually incompatible or alcoholic and non-alcoholic components are accommodated in separate individual containers.

The fact that all the components for a specific mixed beverage are already decanted, metered in the required amount, into the individual containers of the multiple-container bundle allows the consumer to procure and to mix together his mixed beverage very easily. For the hotel industry and hospitality industry too, it is now very simple to prepare any mixed beverage that a guest desires. The various mixed beverages, which are still present in unmixed form in multiple-container bundles, can each be purchased and stored in their entirety en masse or individually. As required, the corresponding multiple-container bundle is utilized and the mixed beverage ordered is prepared from the components contained therein. If appropriate, ice is also added. It is no longer possible for individual components for a mixed beverage to be missing. Broken-open packs, still containing remnants of individual components for the mixed beverage, which can go off, are avoided. The preparation of the mixed beverages is very simple and does not require any specially trained bar staff. The relatively large outer surface of the multiple-container bundle can be used for information and/or advertising purposes. In particular, it is possible to indicate there, in writing and/or pictures, which mixed beverage is contained in the multiple-beverage bundle and which individual components the individual containers contain. The can-like individual containers are held by their end sides, which are provided with the opening which can be torn open, in the coupling element. The opening end side of the individual containers usually has a beaded edge allowing simple interlocking of the individual containers with the correspondingly formed receptacles of the coupling element. Thus, a correspondingly simply embodied coupling element can be used for connecting the two individual containers to each other in order to form a structural unit. This simplifies and reduces the cost of producing the multiple-component bundle. If at least one of the individual containers has a lid which can be torn open completely, this facilitates emptying of the components contained in the individual containers. If the container provided with the lid which can be torn open completely is embodied so as to be appropriately large, the content of the second individual container may be added to the content of this container. Indeed, the container with the lid which can be torn open can then even be used as a drinking cup.

An advantageous variant embodiment of the invention provides for the provision of two individual containers embodied as beverage cans. Beverage cans are widely tried and tested and can easily be stored and stacked. On account of their light and gas permeability, they offer good requirements for stability in storage. In terms of their shape too, they are also very well suited to use in a multiple-container bundle.

A very expedient variant embodiment of a multiple-container bundle with beverage cans provides for two beverage cans to be oriented axially to each other. The axial arrangement of the beverage cans saves space and facilitates storage of the multiple-container bundle. The coupling element is, for example, a relatively thin-walled plastics material part which is circular or annular in cross section and at the upper side and underside of which there are provided peripheral webs, from which clamping cams protrude radially inward. The clamping cams serve to interlock with undercuts of a fold at the end side of a beverage can. The clamping cams offer adequate protection against accidental releasing of a beverage can from the multiple-container bundle. On the other hand, the beverage cans can be removed from the coupling element, if required, with the exertion of only relatively low force.

A first variant of the multiple-container bundle with two beverage cans arranged axially one above the other provides for the two beverage cans to have the same maximum filling volume. Preferably, the beverage cans are in this case embodied in a similar manner. If account is taken of the fact that mixed beverages are prepared conventionally for drinking glasses having a volume of 200 ml, use may be made of beverage cans which are standardized for the multiple-container bundle and have a maximum filling volume of 150 ml. The use of standardized can sizes reduces the cost of the multiple-container bundle. Ideally, the maximum filling volume of the individual cans is not much greater than the volume of the components contained, so that there is no risk of an undesirable build-up of pressure occurring in the event of accidental heating during transportation or storage of the multiple-container bundle in the individual containers.

In a further variant of the invention, the beverage cans, which are coupled to form a multiple-container bundle, can be arranged in an over-pack comprising two cup-like vessels. As an additional use, the two cup-like vessels of the over-pack can be releasably connected to form a shaker. The multiple-container bundle with an over-pack offers the consumer all of the constituent parts required for producing the mixed beverage. All of the individual components of the mixed beverage are already contained in the coupled beverage cans. The over-pack forms the shaker. For producing the mixed beverage, the content of the two opened beverage cans must merely be poured into the receiving cup of the shaker. Afterwards, the second cup-like vessel is placed on as a lid. The cup-like vessels may be, for example, beverage cans which are open on one side and have a relatively large volume. For example, a similar coupling element may be provided for the connection of the two cup-like vessels as for the beverage cans of the multiple-container bundle. Once the content contained in the shaker has been shaken, the finished mixed beverage can be poured out into a drinking glass. If appropriate, the mixed beverage can also be drunk out of the receiving cup of the shaker. If required, ice may also be added.

An alternative variant of the multiple-container bundle with two beverage cans arranged axially one above the other provides for the two beverage cans to have different maximum filling volumes. For this purpose, the two beverage cans are advantageously embodied so as to be of different size. The larger beverage can has in this case a maximum filling volume of at least 250 ml, while the smaller beverage can has a maximum filling volume of 150 ml. Beverage cans having the cited maximum filling volumes are tried and tested and standardized. This facilitates and reduces the cost of manufacturing the coupling element and the multiple-container bundle. It goes without saying that the beverage cans are never filled completely. Conventionally, the content of the two beverage cans is supplemented to form a mixed beverage having a total volume of approx. 200 ml.

It has been found to be advantageous if the larger beverage can is equipped with a lid which can be torn open completely. Once the lid which can be torn open completely has been completely removed, the content of the smaller beverage can may then be added to the content of the larger beverage can. If the larger beverage can is reclosed, it can be used as a shaker. An advantageous variant embodiment of the multiple-container bundle provides, for this purpose, for the coupling element to be embodied in a lid-like manner and to be able to be placed, once the lid which can be torn open completely has been removed, onto the larger beverage can as a closure. Once the mixed beverage has been produced by shaking, the coupling element is detached again. The finished mixed beverage can be drunk directly out of the larger beverage can. If appropriate, ice is also added.

In a further variant embodiment of the multiple-container bundle, both beverage cans having differently large maximum filling volumes are releasably connected to each other by an annularly embodied coupling element. Both beverage cans have lids which can be torn open completely. In this variant, once the two lids which can be torn open completely have been removed and the content of the smaller beverage can has been poured into the larger beverage can, the two beverage cans may be reconnected to each other via the annular coupling element. The coupled beverage cans then form the shaker in which the mixed beverage is fully mixed. The fully-mixed mixed beverage can then be drunk directly out of the larger beverage can or be poured into a separate drinking glass.

In a further variant of the multiple-container bundle, a modified coupling element has an openable chamber for liquid and/or solid individual components of a mixed beverage. This variant embodiment extends the possible variations of mixed beverages which can be offered in a multiple-container bundle according to the invention.

The use of beverage cans, which are joined together with a coupling element to form a multiple-container bundle, for the decanting and the storing of all of the individual components of mixed beverages provides for consumers and for the hotel industry and hospitality industry a simple possibility for producing, for enjoying and for offering mixed beverages, in particular cocktails. As a result of the use of standardized beverage cans and sizes, the multiple-container bundle can be manufactured very cost-effectively.

Further advantages and features will emerge from the following description of exemplary embodiments of the invention with reference to the schematic drawings which are not true to scale and in which:

BRIEF DESCRIPTION OF THE SEVERAL VIEWS OF THE DRAWING

FIG. 1 is an exploded view of a first exemplary embodiment of a multiple-container bundle;

FIG. 2 is a joined-together view of the multiple-container bundle from FIG. 1;

FIG. 3 shows the emptying of individual containers of the multiple-container bundle into a receiving cup of a shaker;

FIG. 4 shows the closed shaker;

FIG. 5 is an exploded view of a second exemplary embodiment of the multiple-container bundle;

FIG. 6 shows the exemplary embodiment according to 5 in the assembled state;

FIG. 7 shows the emptying of a second individual container into a first individual container;

FIG. 8 shows a closed first individual container as a receiving cup; and

FIG. 9 shows a joined-together multiple-container bundle as a shaker.

DESCRIPTION OF THE INVENTION

FIGS. 1 and 2 show schematically a first exemplary embodiment of the multiple-container bundle according to the invention which is provided in its entirety with reference numeral 10. The multiple-container bundle 10 comprises two individual containers which are embodied, in particular, as beverage cans 11, 12. In the multiple-container bundle 10, the two beverage cans 11, 12 are oriented axially to each other and arranged in such a way that their end faces 13, 14, at each of which a pouring-out opening which can be torn open is provided, oppose each other. The two beverage cans 11, 12 are connected to each other so as to be releasable by a coupling element 15 and form a unit. The coupling element 15 is, for example, a relatively thin-walled plastics material part which is circular or annular in cross section and at the upper side and underside of which there are provided peripheral webs, from which clamping cams protrude radially inward. The clamping cams serve to interlock with undercuts of folds at the mutually facing end sides 13, 14 of the two beverage cans 11, 12.

The cross section of the coupling element 15 does not necessarily have to be circular or annular. Depending on the cross sections of the beverage cans to be connected to one another, the coupling element can also have an oval or a polygonal cross section.

The beverage cans 11, 12 of the first exemplary embodiment of the multiple-container bundle 10 are embodied in a similar manner and have a maximum filling volume of approx. 150 ml. This filling volume is sufficient to produce from the content of the two beverage cans 11, 12 a mixed beverage which conventionally has a volume of 200 ml. Mutually incompatible or alcoholic and non-alcoholic components of the mixed beverage to be produced are stored separately in the two beverage cans 11, 12 of equal size. Undesirable reactions of the individual components with one another or segregations which may be reversed only with difficulty are avoided in this way. The lower beverage can 11 contains, for example, 135 ml of an alcohol-free fruit juice mixture.

FIG. 3 indicates that the beverage cans 11, 12, which are separated from the coupling element and opened at their end sides 13, 14, are emptied into a receiving cup 1 of a shaker. Finally, FIG. 4 shows a shaker 3 in which the receiving cup 1 is closed by a cup-like lid part 2. For producing the desired mixed beverage, the component mix is shaken within the shaker 3; this is indicated by the double-headed arrow P. Afterwards, the shaker is opened, and the finished mixed beverage can be poured out into a drinking vessel and drunk. If appropriate, ice is also added before the shaker 3 is closed. The ice can further improve the blending of the individual components poured into the shaker during shaking. If required, ice may also be added to the drinking vessel before the finished mixed beverage is enjoyed.

The shaker 3 may be a conventional shaker such as is sufficiently well known in the art. The shaker 3 may for example also consist of two beverage cans having a larger volume than the beverage cans of the multiple-container bundle. This provides the opportunity to offer the multiple-container bundle within the shaker. The two larger beverage cans can in this case be connected to each other so as to be releasable using a coupling element similar to the coupling element of the multiple-container bundle.

A second exemplary embodiment, illustrated in FIGS. 5 and 6, of a multiple-container bundle is denoted in its entirety by reference numeral 20. The multiple-container bundle 20 comprises two beverage cans 21, 22 which are of different size in their embodiment. In the multiple-container bundle 10, the two beverage cans 21, 22 are, again, oriented axially to each other and arranged in such a way that their end faces 23, 24, at which the pouring-out opening which can be torn open is provided, oppose each other. The two beverage cans 21, 22 are connected to each other so as to be releasable by a coupling element 25 to form a unit. The coupling elements 25 may, again, be a relatively thin-walled plastics material part which is circular or annular in cross section and at the upper side and underside of which there are provided peripheral webs, from which clamping cams protrude radially inward. The clamping cams serve to interlock with undercuts of folds at the mutually facing end sides 23, 24 of the two beverage cans 21, 22.

The two beverage cans 21, 22 are different sizes and have mutually different maximum filling volumes. For example, a first, lower beverage can 21 has a maximum filling volume of 250 ml. The second beverage can 22, which is the upper beverage can in the multiple-container bundle 20, has a maximum filling volume of 150 ml. Mutually incompatible or alcoholic and non-alcoholic components of the mixed beverage to be produced are stored separately in the two different-sized beverage cans 21, 22. Undesirable reactions of the individual components with one another or segregations which may be reversed only with difficulty are avoided in this way. 65 ml of a spirits mixture are, for example, contained in the lower, larger beverage can 21. The upper, smaller beverage can 22 is, for example, filled with 135 ml of a fruit juice mixture.

FIG. 7 shows the emptying of the content of the upper, smaller beverage can 22 into the lower, larger beverage can 21. The lower, larger beverage can 21 is equipped for this purpose with a lid which can be torn open completely and is removed beforehand. Cans with lids which can be torn open completely are sufficiently known per se. However, the use of lids which can be torn open completely in beverage cans is a novel application.

FIG. 7 shows the larger, lower beverage can 21 filled with the individual components of the mixed beverage. The open end side of the beverage can 21, from which the lid which can be torn open completely has been removed, is closed by a lid part 26. The lid part 26 may be formed by the coupling element of the multiple-container bundle. For this purpose, the coupling element has, for example, a circular closure plate, from the upper side and underside of which the peripheral webs with the clamping cams protrude. The lid part 26 may also be a modified coupling element which has a somewhat higher design and has an openable chamber for further solid and/or liquid components of the mixed beverage to be produced. The lower beverage can 21, which is closed by the lid part 26, forms a shaker in which the individual components which are poured in can be mixed by shaking to form the desired mixed beverage. The shaking is, again, indicated by a double-headed arrow P. If appropriate, ice may also be added before the lower beverage can 21 is closed. After shaking, the lid part 26 is detached. The fully prepared mixed beverage can be drunk directly out of the lower beverage can 21. If appropriate, ice may also be added beforehand. It goes without saying that the mixed beverage can also be poured out into a drinking glass before the beverage is enjoyed.

FIG. 9 shows a variant of the multiple-container bundle according to FIGS. 5 and 6, in which the lower, larger beverage can 21 and the upper beverage can 22 are joined together by means of a coupling elements 25 to form a shaker 3. For this purpose, both beverage cans 21, 22 are equipped with lids which can be torn open completely. The coupling element 25 is embodied in an annular manner and allows unimpeded communication of the volumes of the two beverage cans 21, 22 which are joined together to form a shaker 3. Once the lid which can be torn open completely has been removed from the two beverage cans 21, 22, the content of the upper beverage can 22 is poured out into the larger, lower beverage can 21. Afterwards, the two beverage cans 21, 22 are joined together again by the coupling element to form a structural unit. If appropriate, ice is added beforehand. The joined-together structural unit 21, 22, forms the shaker 3. The individual components contained in the shaker are mixed by shaking to form the desired mixed beverage. This is indicated in FIG. 9, again, by a double-headed arrow 1. After mixing, the shaker 3 is opened and the coupling element 25 is removed. Afterwards, the finished mixed beverage may be enjoyed directly from the larger, lower beverage can 21, if appropriate with the addition of further ice. It goes without saying that the mixed beverage may also be poured out into a drinking glass before the beverage is enjoyed.

The use of beverage cans, which are joined together with a coupling element to form a multiple-container bundle, for the decanting and the storing of all of the individual components of mixed beverages provides for consumers and for the hotel industry and hospitality industry a simple possibility for producing, for enjoying and for offering mixed beverages, in particular cocktails. As a result of the use of standardized beverage cans and sizes, the multiple-container bundle can be manufactured cost-effectively. The multiple-container bundle is broadly applicable and may even be used as a shaker and drinking vessel.

The invention claimed is:

1. A multiple-container bundle, comprising:
at least two individual containers formed as beverage cans with end-side pouring-out openings, each of said containers having an end side formed with a fold defining an undercut;
at least one of said containers having a lid configured to be torn open substantially completely;
a coupling element releasable connecting said individual containers to one another by clampingly engaging each of said containers with said end-side pouring-out openings facing one another, said coupling element having clamping cams configured to interlock with said undercuts of said folds at the end side of said containers;
said individual containers and said coupling element together forming a structural unit; and
said containers of a respective said structural unit together accommodating individual components required for a specific mixed beverage in metered form, and said individual containers accommodating alcoholic and non-alcoholic components in separate containers.

2. The multiple-container bundle according to claim 1, wherein said individual containers are substantially circular-cylindrical beverage cans.

3. The multiple-container bundle according to claim 2, wherein said coupling element is configured to hold two beverage cans, in coaxial and facing relationship to each other.

4. The multiple-container bundle according to claim 3, wherein said two beverage cans have a substantially identical maximum filling volume.

5. The multiple-container bundle according to claim 4, wherein said beverage cans are substantially similar cans of a standardized size and a maximum filling volume of 150 ml.

6. The multiple-container bundle according to claim 4, which further comprises an over-pack containing said beverage cans, said over-pack comprising two cup-shaped vessels releasably connected to form a beverage shaker.

7. The multiple-container bundle according to claim 3, wherein said two beverage cans have mutually different maximum filling volumes.

8. The multiple-container bundle according to claim 7, wherein said two beverage cans have mutually different sizes.

9. The multiple-container bundle according to claim 8, wherein said beverage cans are standardized size cans.

10. The multiple-container bundle according to claim 9, wherein one of said cans is a smaller beverage can with a maximum filling volume of 150 ml and another of said cans is a larger beverage can with a maximum filling volume of 250 ml.

11. The multiple-container bundle according to claim 10, wherein said larger beverage can is provided with said lid that can be torn open completely.

12. The multiple-container bundle according to claim 11, wherein said coupling element is embodied in a lid shape and configured, once said lid that can be torn open completely has been removed, to be placed onto said larger beverage can to form a closure.

13. The multiple-container bundle according to claim 7, wherein both said beverage cans are formed with lids that can be torn open completely and said coupling element is an annular member.

14. The multiple-container bundle according to claim 1, wherein said coupling element is formed with a chamber for housing liquid and/or solid individual components for a mixed beverage.

15. The multiple-container bundle according to claim 10, wherein said larger beverage can is configured for use as a shaker and/or drinking cup for a beverage mixed from the components accommodated in the individual said containers.

16. The multiple-container bundle according to claim 13, wherein said containers together form a shaker for a mixed beverage to be produced from the components accommodated in the individual said containers.

17. A beverage storage and decanting system, comprising a multiple-container bundle according to claim 1 configured for decanting and storing all of the individual components of a mixed beverage.

* * * * *